(12) United States Patent
Saha et al.

(10) Patent No.: US 12,399,768 B1
(45) Date of Patent: Aug. 26, 2025

(54) METHOD AND SYSTEM FOR DETECTING ANOMALOUS SUB-SEQUENCES IN METADATA

(71) Applicant: Dell Products L.P., Round Rock, TX (US)

(72) Inventors: Saheli Saha, Kolkata (IN); Meenakshi Parameswaran, Chennai (IN); Prerit Jain, New Delhi (IN); Srivats Athindran, Chennai (IN); Guhesh Swaminathan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/626,051

(22) Filed: Apr. 3, 2024

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC ............................ G06F 11/079; G06F 11/0709
See application file for complete search history.

(56) References Cited

U.S. PATENT DOCUMENTS

| | | | |
|---|---|---|---|
| 9,465,684 | B1 | 10/2016 | Carter et al. |
| 10,095,504 | B1 | 10/2018 | Khokhar et al. |
| 11,636,004 | B1 | 4/2023 | Ni et al. |
| 11,636,125 | B1 | 4/2023 | Carmona Perez et al. |
| 2021/0173937 | A1* | 6/2021 | Vargas .................. G06F 21/552 |
| 2022/0308952 | A1 | 9/2022 | Ni et al. |
| 2022/0309387 | A1* | 9/2022 | Rodriguez ............ H04L 9/3213 |
| 2023/0021373 | A1 | 1/2023 | Kabbinale et al. |

* cited by examiner

*Primary Examiner* — Jigar P Patel
(74) *Attorney, Agent, or Firm* — Chamberlain Hrdlicka; Aly Z. Dossa

(57) ABSTRACT

A method for managing an anomaly in a client includes: obtaining, by an analyzer, historical metadata (HM); obtaining, by the analyzer, an error description that is associated with the HM; analyzing, by the analyzer, the HM to generate a first data frame (DF); generating, by the analyzer, a second DF and a third DF based on the first DF, in which the second DF and the third DF are sent to an engine; generating, by the analyzer, a fourth DF based on the first DF and error description, in which the fourth DF is sent to the engine; tuning, by the engine, an anomaly detection model (ADM) to obtain a tuned ADM using: a first target parameter (TP) and the second DF; a second TP and the third DF; a third TP and the fourth DF; and initiating, by the engine, notification of an administrator about the tuned ADM.

20 Claims, 9 Drawing Sheets

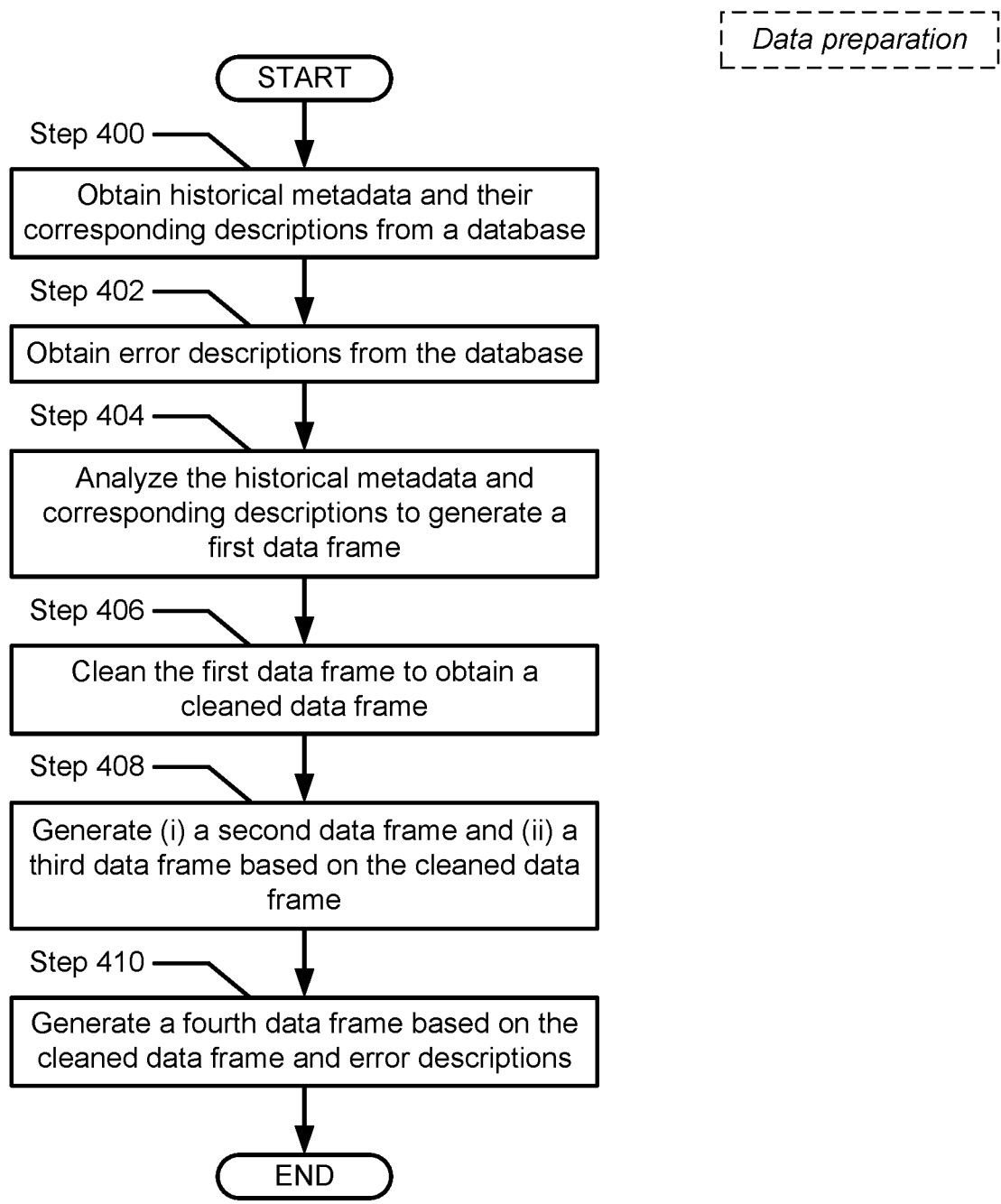
FIG. 4.1

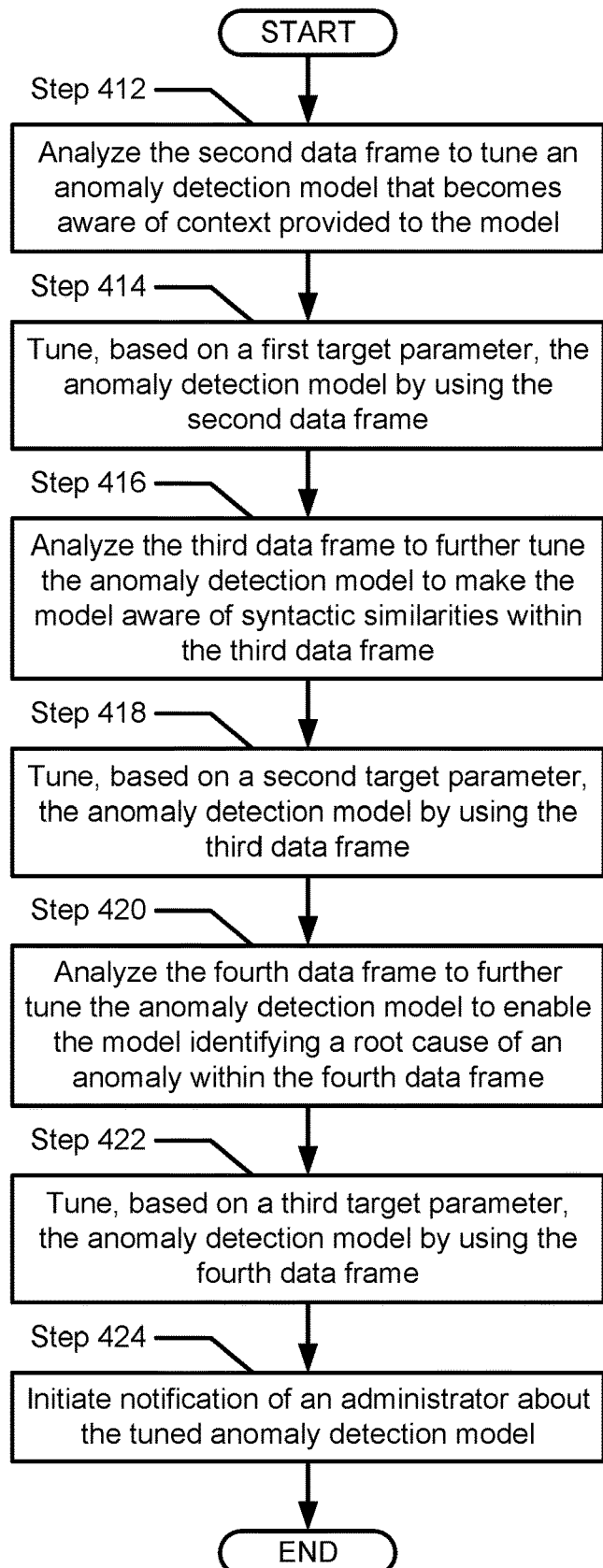
FIG. 4.2

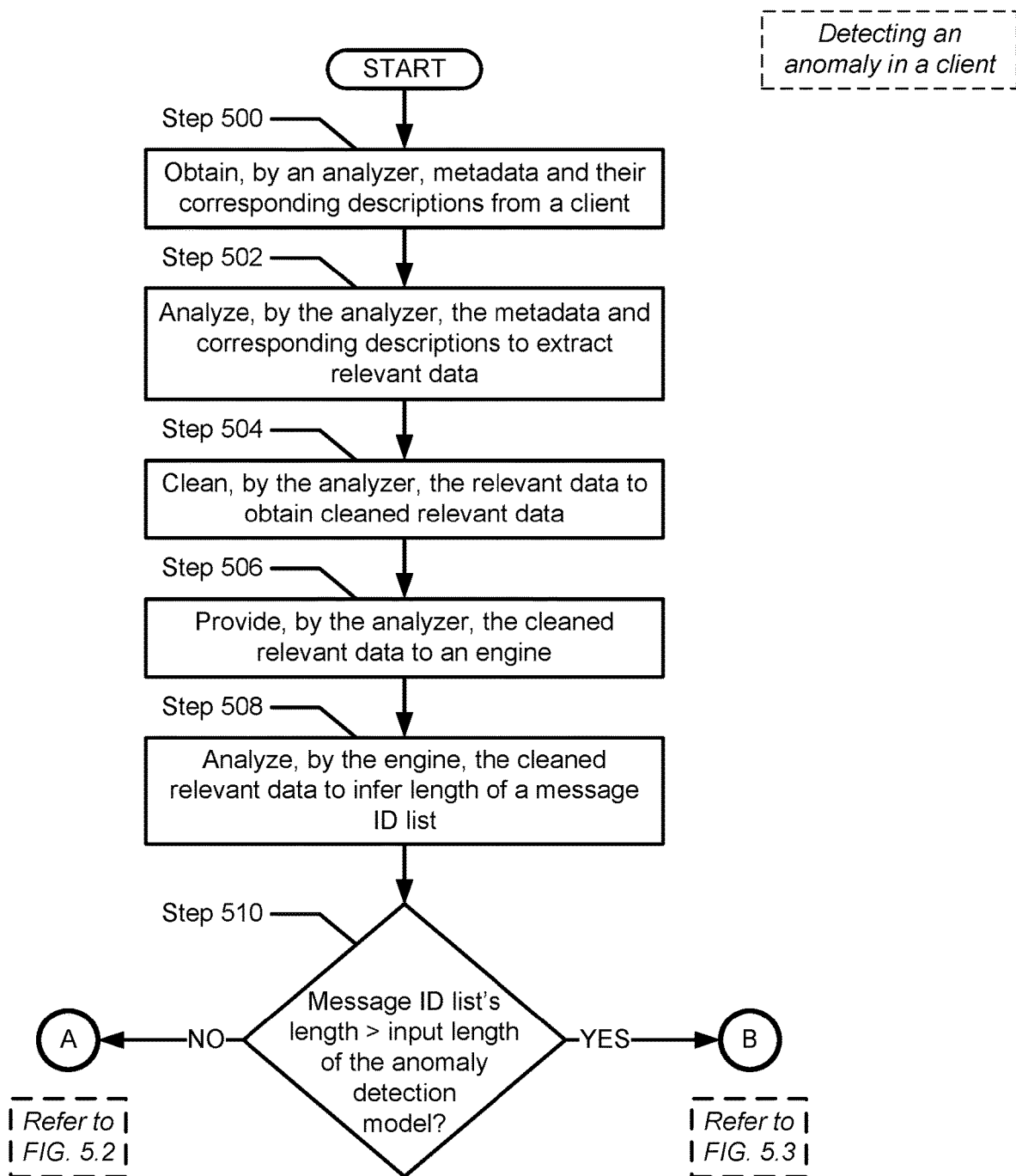
FIG. 5.1

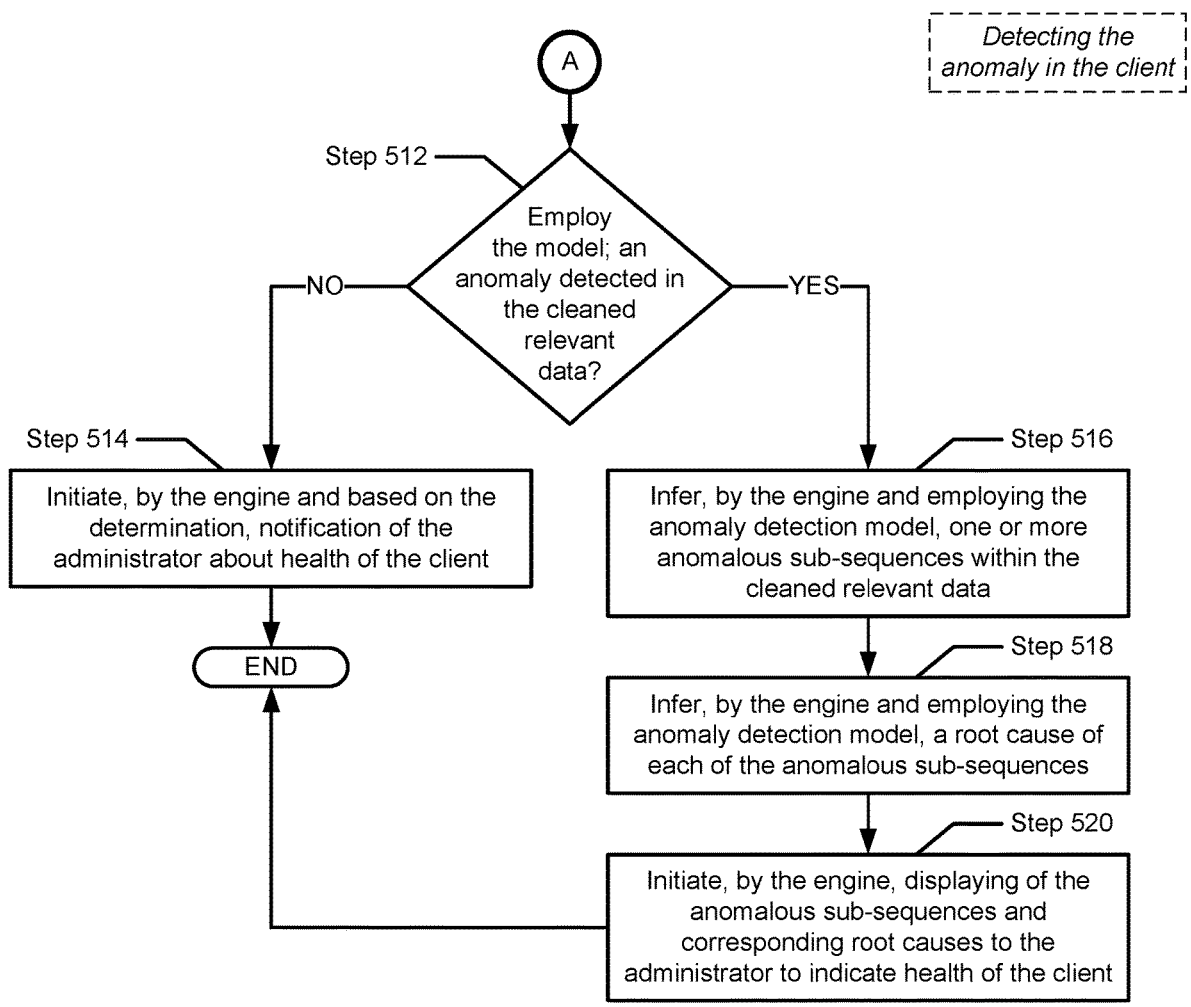
FIG. 5.2

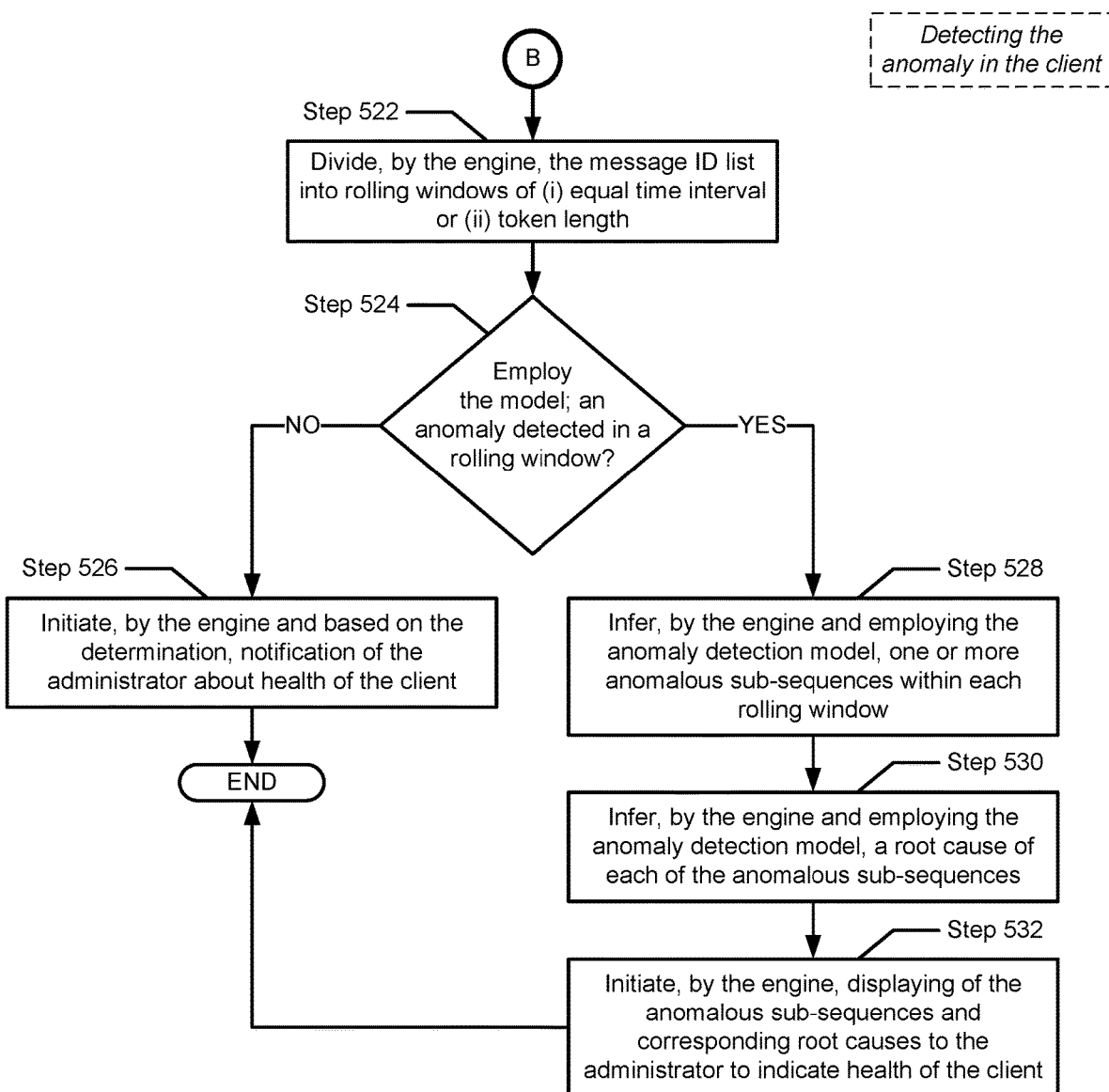
FIG. 5.3

METHOD AND SYSTEM FOR DETECTING ANOMALOUS SUB-SEQUENCES IN METADATA

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 4.1 shows a method for preparing data in accordance with one or more embodiments disclosed herein.

FIG. 4.2 shows a method for tuning an anomaly detection model in accordance with one or more embodiments disclosed herein.

FIGS. 5.1-5.3 show a method for detecting an anomaly in a client (e.g., a computing device) in accordance with one or more embodiments disclosed herein.

DETAILED DESCRIPTION

Figure 1:
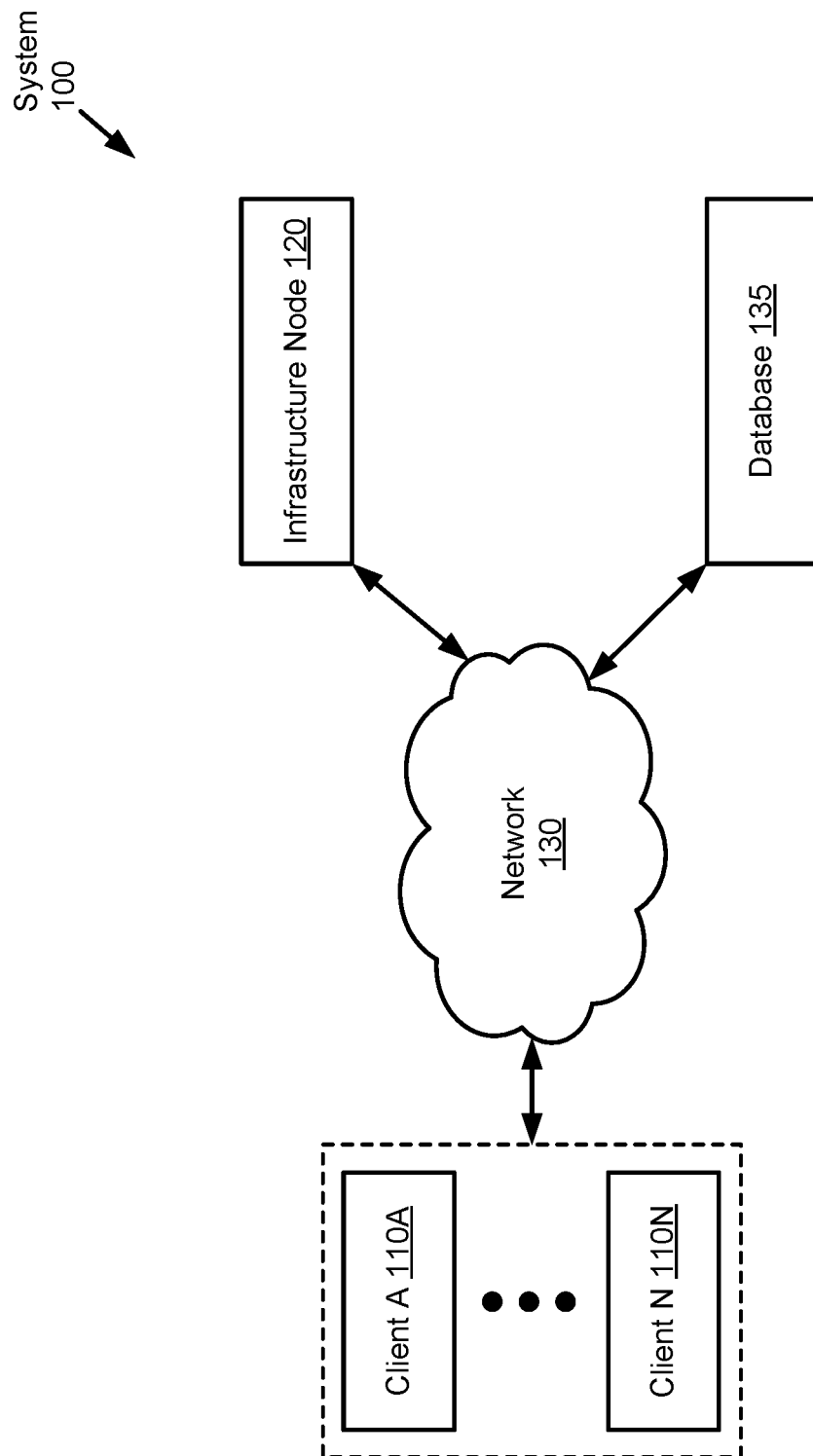
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Recently, with the advent of models (e.g., machine learning (ML) models, large language models (LLMs), etc.), users (e.g., engineers, researchers, experts, etc.) and organizations/enterprises have started to explore a wide range of use cases that these models may be applied and accurate outputs/results may be obtained. In most cases, LLMs are trained (and/or fine-tuned) with explicit domain data to generate a contextual awareness, in which many redundant tasks may be automated towards increasing revenue generation.

From an enterprise standpoint, hardware computing devices such as servers and storage products are key components to assist businesses in multiple areas, in which these products need to constantly evolve to satisfy ever-growing customer requirements (e.g., Organization A may need to keep modernizing storage products to serve customers better). For that reason, multiple testing and/or evaluation of these products may need to be performed before shipping these products (e.g., at a deployment site, at a user site, etc.) so that customers experience a minimum amount of issues.

Mostly, system logs (e.g., files that record system activities across different hardware and software components of a computing device) that are generated, for example, during a testing process (or an issue resolution process) assist users to get to know details of an issue and to reach a conclusion. For example, a system log may specify which component failed and assist engineers to rectify the issue. In some cases, a system log may specify an unexpected event (e.g., an anomaly) that may not immediately affect ongoing production workloads (e.g., writing data to a table, reading the data from the table, etc.) on a client but may cause another component related issue on the client in the future.

For example, consider a scenario where an engineer is performing a test to evaluate a power configuration on a storage product and an unexpected event (that is linked to a network interface card (NIC)), in which the event (i) may be occurred because of an internal issue in the storage product and (ii) may not affect the power configuration (but may affect NIC related activities in the storage product). In this scenario, even though the storage product just experiences an anomaly (not a failure), detecting/identifying the anomaly may become a difficult task to perform, considering the amount of data that the engineer needs to take into account for analysis purposes.

On the other hand, conventional approaches/models may detect the presence of an anomaly in a computing device (e.g., by using syntactic learning); however, they are not capable of (i) detecting anomalous sub-sequences (related to the anomaly) in a system log, (ii) extracting a root cause of each of the anomalous sub-sequences, and (iii) detecting various types of anomalies that can occur in, for example, log files (because these models mostly operate based on syntactic learning). Further, conventional models are not capable of dynamically (or automatically) adjusting their input context window/size/length.

For at least the reasons discussed above and without requiring resource-intensive efforts (e.g., time, engineering, etc.), a fundamentally different approach/framework is needed (e.g., a framework to detect anomalous sub-sequences in metadata (e.g., system logs, application logs, etc.) and to perform a root cause analysis of the anomalous sub-sequences (or a resulting anomaly) by leveraging models (e.g., LLMs, ML models, etc.)).

Embodiments disclosed herein relate to methods and systems for using ML models to identify anomalies (e.g., unwanted entries in a log that may not cause failures of execution but may lead to other fatal issues in the future) in computing devices based on metadata. As a result of the processes discussed below, one or more embodiments disclosed herein advantageously ensure that: (i) a useful ML-based (or data science-based) framework is provided to an engineer/administrator to at least (a) assist the administrator for accurately detecting one or more anomalies in, for example, system logs and (b) to increase the administrator's productivity/performance (in terms of taking corrective actions and remediating hardware/software related issues faster) (e.g., to reduce the time taken for the administrator to resolve any hardware/software issues occurred on a computing device (e.g., a laptop, a server, a data center, a cloud offering, etc.) and/or prevent any future hardware/software issues that may occur on that computing device); (ii) automate at least some of the "hardware/software issue detection" tasks/duties assigned to an administrator for a better administrator experience (e.g., higher job satisfaction, minimizing chances of burnout in an administrator position because of the magnitude of actions that an administrator need to do, assisting the administrator with respect to high amount of time-sensitive tasks, etc.); (iii) internally and externally obtained data (e.g., system logs) are engineered (via one or more end-to-end linear, non-linear, and/or ML models) to help an anomaly detection model (and/or an administrator) to derive quantitative factors/metrics/trends (e.g., root causes) impacting health of a corresponding computing device (so that, for example, the administrator may make better informed decisions with respect to mitigating potential risks associated with the device); (iv) the framework can be used to analyze any type of metadata (e.g., system logs, application logs, etc.) by fine-tuning a corresponding anomaly detection model; (v) compared to conventional anomaly detection approaches, the framework provides a more powerful and versatile anomaly detection in terms of accuracy, precision, recall (e.g., an ability of an ML model to identify all the relevant classes within a data set), and/or F1 score (e.g., a harmonic mean of precision and recall values of an ML model); (vi) if present, anomalous sub-sequences (related to an anomaly) within each metadata are detected by using an LLM (e.g., an anomaly detection model), with contextual and syntactic learning from a database of historical metadata (on which the LLM is fine-tuned); (vii) presence of an anomaly (along with the identification of anomalous sub-sequences within metadata) is detected using the LLM; (viii) rolling windows are leveraged to dynamically (or automatically) adjust input context length (or token length) of the LLM such that the LLM may process, for example, system logs that exceed the input context length (or the input capacity) of the LLM; and/or (ix) by fine-tuning the LLM via business specific data (e.g., historical metadata (including various different log types)) and prompt engineering, the LLM can identify an anomaly (e.g., in a system log), a root cause (e.g., a reasoning) of the anomaly (which is possible because of the contextual and syntactical learning capabilities of the LLM), and one or more anomalous sub-sequences within the system log.

The following describes various embodiments disclosed herein.

FIG. 1 shows a diagram of a system (100) in accordance with one or more embodiments disclosed herein. The system (100) includes any number of clients (e.g., Client A (110A), Client B (110B), etc.), a network (130), any number of infrastructure nodes (e.g., 120), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110B, etc.), the infrastructure node (120), the network (130), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110B, etc.) and the infrastructure node (120) are shown to be operatively connected through a communication network (e.g., 130), the clients (e.g., 110A, 110B, etc.) and the infrastructure node (120) may be directly connected (e.g., without an intervening communication network).

Further, the functioning of the clients (e.g., 110A, 110B, etc.) and the infrastructure node (120) is not dependent upon the functioning and/or existence of the other components (e.g., devices) in the system (100). Rather, the clients and the infrastructure node may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110B, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the infrastructure node (120)) from the users. By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the infrastructure node (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110B, etc.) may be geographically distributed devices (e.g., user devices, front-end devices, etc.) and may have relatively restricted hardware and/or software resources when compared to the infrastructure node (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110B, etc.) may correspond to computing devices that one or more users use to interact with one or more components of the system (100).

In one or more embodiments, a client (e.g., 110A, 110B, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110B, etc.) may utilize, rely on, or otherwise cooperate with the infrastructure node (120). For example, the clients may issue requests to the infrastructure node to receive responses and interact with various components of the infrastructure node. The clients may also request data from and/or send data to the infrastructure node (for example, the clients may transmit information to the infrastructure node that allows the infrastructure node to perform computations, the results of which are used by the clients to provide services to the users). As yet another example, the clients may utilize computer-implemented services provided by the infrastructure node. When the clients interact with the infrastructure node, data that is relevant to the clients may be stored (temporarily or permanently) in the infrastructure node.

In one or more embodiments, a client (e.g., 110A, 110B, etc.) may be capable of, e.g.: (i) collecting users' inputs, (ii) correlating collected users' inputs to the computer-implemented services to be provided to the users, (iii) communicating with the infrastructure node (120) that perform computations necessary to provide the computer-implemented services, (iv) using the computations performed by the infrastructure node to provide the computer-implemented services in a manner that appears (to the users) to be performed locally to the users, and/or (v) communicating with any virtual desktop (VD) in a virtual desktop infrastructure (VDI) environment (or a virtualized architecture) provided by the infrastructure node (using any known protocol in the art), for example, to exchange remote desktop traffic or any other regular protocol traffic (so that, once authenticated, users may remotely access independent VDs).

As described above, the clients (e.g., 110A, 110B, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface a client with external entities (e.g., the infrastructure node (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110B, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 6:
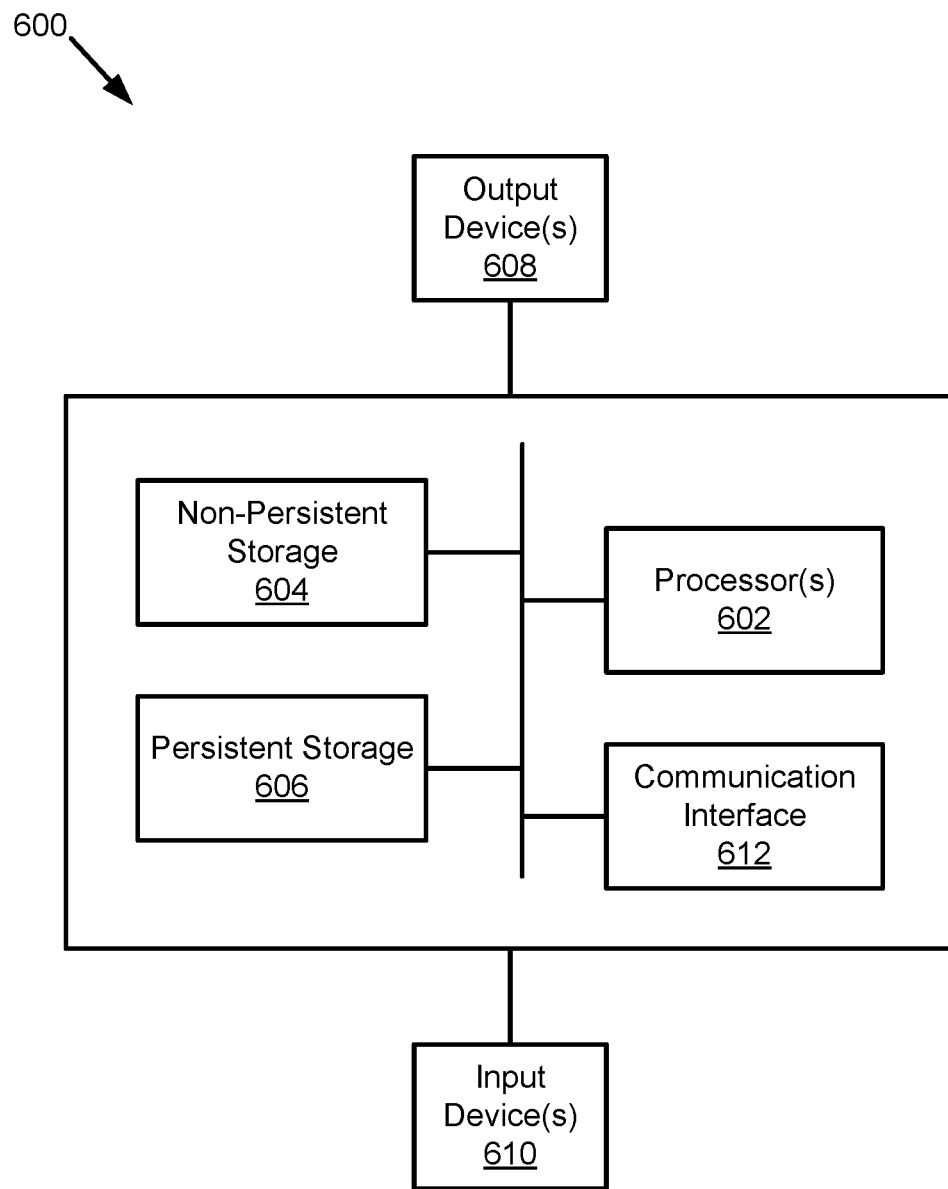
FIG. 6 shows a diagram of a computing device in accordance with one or more embodiments disclosed herein.

Further, in one or more embodiments, a client (e.g., 110A, 110B, etc.) may be implemented as a computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110B, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the infrastructure node (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the infrastructure node (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110B, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the infrastructure node may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another infrastructure node (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another infrastructure node, coordinating its efforts to complete the request more efficiently than if the infrastructure node had been responsible for completing the request); (xi) provide software-defined data protection for the clients (e.g., 110A, 110B, etc.); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the infrastructure node to other infrastructure nodes of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an infrastructure node may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the infrastructure node (120) may communicate with, for example, the database (135) and/or other storage devices in the system (100).

As described above, the infrastructure node (120) may be capable of providing a range of functionalities/services to the users of the clients (e.g., 110A, 110B, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the infrastructure node. Specifically, the service manager (i) may identify services to be provided by the infrastructure node (for example, based on the number of users using the clients) and (ii) may limit communications of the clients to receive infrastructure node provided services.

For example, the priority (e.g., the user access level) of a user may be used to determine how to manage computing resources of the infrastructure node (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the infrastructure node (120) (e.g., while the computing resources of the infrastructure node may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the infrastructure node (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single infrastructure node (e.g., 120) is considered above, the term "node" includes any collection of systems or sub-systems that individually or jointly execute a set, or multiple sets, of instructions to provide one or more computer-implemented services. For example, a single infrastructure node may provide a computer-implemented service on its own (i.e., independently) while multiple other nodes may provide a second computer-implemented service cooperatively (e.g., each of the multiple other nodes may provide similar and or different services that form the cooperatively provided service).

As described above, the infrastructure node (120) may provide any quantity and any type of computer-implemented services. To provide computer-implemented services, the infrastructure node may be a heterogeneous set, including a collection of physical components/resources (discussed above) configured to perform operations of the node and/or otherwise execute a collection of logical components/resources (discussed above) of the node.

In one or more embodiments, the infrastructure node (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the infrastructure node (120) may perform other functionalities without departing from the scope of the embodiments disclosed herein. In one or more embodiments, the infrastructure node may be configured to perform (in conjunction with the database (135)) all, or a portion, of the functionalities described in FIGS. 4.1-5.3.

In one or more embodiments, the infrastructure node (120) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the infrastructure node described throughout the application.

Alternatively, in one or more embodiments, similar to a client (e.g., 110A, 110B, etc.), the infrastructure node (120) may also be implemented as a logical device.

Figure 2:
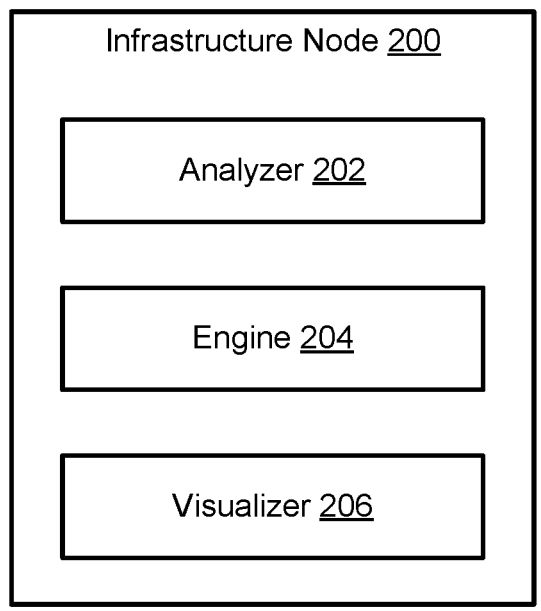
FIG. 2 shows a diagram of an infrastructure node in accordance with one or more embodiments disclosed herein.

In one or more embodiments, the infrastructure node (120) may host an analyzer (e.g., 202, FIG. 2), an engine (e.g., 204, FIG. 2), and a visualizer (e.g., 206, FIG. 2). Additional details of the analyzer, engine, and visualizer are described below in reference to FIG. 2. In the embodiments of the present disclosure, the database (135) is demonstrated as a separate entity from the infrastructure node (120); however, embodiments disclosed herein are not limited as such. The database (135) may be demonstrated as a part of the infrastructure node (e.g., as deployed to the infrastructure node).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the infrastructure node (120), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a time- stamp showing when a specific request is processed by an application; a port number (e.g., associated with a hardware component of a client (e.g., 110B)); a protocol type associated with a port number; computing resource details (including details of hardware components and/or software components) and an IP address details of an infrastructure node (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the infrastructure node (120)); one or more points-in-time and/or one or more periods of time associated with a data recovery event; data for execution of applications/services (including infrastructure node applications and associated end-points); corpuses of annotated data used to build/generate and train processing classifiers for trained ML models; linear, non-linear, and/or ML model parameters (e.g., instructions to the engine (e.g., 204, FIG. 1) on how to train and/or tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an infrastructure node (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an infrastructure node; a size of each of the set of assets protected; a number of each type of a set of data protection policies implemented by a user; configuration information associated with the analyzer (e.g., 202, FIG. 2) (to manage security, network traffic, network access, or any other function/operation performed by the analyzer); configuration information associated with the engine (e.g., 204, FIG. 2) (to manage security, network traffic, network access, or any other function/operation performed by the engine); a job detail of a job (e.g., a data protection job, a data restoration job, a log retention job, etc.) that has been initiated by an infrastructure node; a type of the job (e.g., a non-parallel processing job, a parallel processing job, an analytics job, etc.); information associated with a hardware resource set (discussed below) of the infrastructure node (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer (e.g., 202, FIG. 2); a number of errors encountered when handling a job; a documentation that shows how the analyzer performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, information associated with a hardware resource set (e.g., including at least resource related parameters) may specify, for example (but not limited to): a configurable CPU option (e.g., a valid/legitimate vCPU count per infrastructure node in the system (100)), a configurable network resource option (e.g., enabling/disabling single-root input/output virtualization (SR-IOV) for the infrastructure node (120)), a configurable memory option (e.g., maximum and minimum memory per infrastructure node in the system (100)), a configurable GPU option (e.g., allowable scheduling policy and/or virtual GPU (vGPU) count combinations per infrastructure node in the system (100)), a configurable DPU option (e.g., legitimacy of disabling inter-integrated circuit (I2C) for various infrastructure nodes in the system (100)), a configurable storage space option (e.g., a list of disk cloning technologies across one or more infrastructure node in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per infrastructure node in the system (100), a wake on LAN support configuration (e.g., supported/enabled, not supported/disabled, etc.), a vGPU count per infrastructure node in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., input/output (I/O) operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an operating system that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a version of an OS; a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, metadata (e.g., system logs, application logs, etc.) may be obtained (or dynamically fetched) as they become available (e.g., with no user manual intervention), or by the analyzer (e.g., 202, FIG. 2) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (e.g., 202, FIG. 2) receives a metadata analysis request (or a heath check request for a client), (ii) another infrastructure node of the system (100) accumulates the metadata and provides them to the analyzer at fixed time intervals, or (iii) the database (135) stores the metadata and notify the analyzer to access the metadata from the database. In one or more embodiments, metadata may be access-protected for a transmission from a corresponding client (e.g., 110A) to the analyzer (e.g., 202, FIG. 2), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the analyzer (e.g., 202, FIG. 2) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2, FIG. 2 shows a diagram of an infrastructure node (200) in accordance with one or more embodiments disclosed herein. The infrastructure node (200) may be an example of the infrastructure node discussed above in reference to FIG. 1. The infrastructure node (200) includes the analyzer (202), the engine (204), and the visualizer (206). The infrastructure node (200) may include additional, fewer, and/or different components without departing from the scope of the embodiments disclosed herein. Each component may be operably connected to any of the other component via any combination of wired and/or wireless connections. Each component illustrated in FIG. 2 is discussed below.

In one or more embodiments, the analyzer (202) may include functionality to, e.g.: (i) receive/obtain distributed metadata (e.g., distributed logs) coming from different clients to get a logical view of all logs relevant to process a specific request (e.g., received from an administrator); (ii) use parameters/details available in distributed logs in order to, at least, (a) trace a specific request through a distributed system (e.g., 100, FIG. 1), (b) identify potential errors (e.g., performance issues) occurred while processing the specific request (e.g., which application was down while processing the specific request, what caused that application to went down, etc.), (c) trace requests that display high-latency across all applications (e.g., microservices), (d) in conjunction with the engine (204), reduce mean time to troubleshooting performance issues, (e) in conjunction with the engine (204), get immediate root cause identification of every application impact, and (f) improve user experience by re-establishing end-to-end interoperability; (iii) based on (ii), infer dependencies and connectivity among applications executing on the system (e.g., which applications are working together, which ports are open, etc.); (iv) monitor performance (e.g., a health status) of a client (e.g., 110A, FIG. 1) by obtaining telemetry data (e.g., metadata, computing resource utilization data (or key performance metrics) of hardware and/or software components, etc.) associated with the client; (v) based on (iv) and for each hardware or software component (of the client), derive a continuous average resource utilization value with respect to each computing resource; (vi) based on (iv) and for each hardware or software component (of the client), derive minimum and maximum resource utilization values with respect to each computing resource; (vii) identify health of each component based on average, minimum, and maximum resource utilization values; (viii) based on (vii), automatically react and generate alerts if one of the predetermined maximum resource utilization value thresholds is exceeded; (ix) provide identified health of each component (and, indirectly, health of the client) and generated alerts (if any) to other entities (e.g., 204) in order to manage the health of the client; and/or (x) store monitored resource utilization data and generated alerts (if any) to the database (e.g., 135, FIG. 1) to generate a resource utilization map.

In one or more embodiments, the resource utilization map may be implemented using one or more data structures that includes information regarding the utilization of computing resources (e.g., a hardware resource, a software resource, a CPU, memory, etc.) of the infrastructure node (e.g., 120, FIG. 1) and/or the client (e.g., 110A, FIG. 1). The resource utilization map may specify, for example (but not limited to): an identifier of a microservice, an identifier of a computing resource, an identifier of a resource that has been utilized by a microservice, etc.

The resource utilization map may specify the resource utilization by any means. For example, the resource utilization map may specify an amount of utilization, resource utilization rates over time, power consumption of applications/microservices while utilized by a user, workloads performed using microservices, etc. The resource utilization map may include other types of information used to quantify the utilization of resources by microservices without departing from the scope of the embodiments disclosed herein.

In one or more embodiments, the resource utilization map may be maintained by, for example, the analyzer (202). The analyzer (202) may add, remove, and/or modify information included in the resource utilization map to cause the information included in the resource utilization map to reflect the current utilization of the computing resources. Data structures of the resource utilization map may be implemented using, for example, lists, tables, unstructured data, structured data, etc. While described as being stored locally, the resource utilization map may be stored remotely and may be distributed across any number of devices without departing from the scope of the embodiments disclosed herein.

Further, the analyzer (202) may include functionality to, e.g.: (i) obtain/retrieve historical metadata and their corresponding descriptions (e.g., message descriptions) from the database (e.g., 135, FIG. 1); (ii) obtain/retrieve error descriptions (described below) from the database; (iii) based on (i) and by employing a linear model, a non-linear model, and/or a ML model, analyze the historical metadata and corresponding descriptions to generate a first data frame (discussed below); (iv) based on (iii) and by employing a linear model, a non-linear model, and/or a ML model, clean the first data frame to obtain a cleaned data frame; (v) based on (iv) and by employing a linear model, a non-linear model, and/or a ML model, generate a second data frame (discussed below) and a third data frame (discussed below) using the cleaned data; (vi) based on (ii) and by employing a linear model, a non-linear model, and/or a ML model, generate a fourth data frame (discussed below) using the cleaned data and error descriptions; (vii) obtain/retrieve metadata and their corresponding descriptions from a client (e.g., 110A, FIG. 1); (viii) based on (vii) and by employing a linear model, a non-linear model, and/or a ML model, analyze the metadata and corresponding descriptions to extract relevant data (discussed below); (ix) based on (viii) and by employing a linear model, a non-linear model, and/or a ML model, clean the relevant data to obtain cleaned relevant data; and/or (x) based on (ix), provide the cleaned relevant data to the engine (204).

In one or more embodiments, an error description (e.g., an error log that may be manually prepared by an administrator) may include (or specify), for example (but not limited to): a hardware component failure that is reported by a client, an anomaly that is occurred in a client, a log that includes one or more anomalies (e.g., a log that includes one or more anomalous sub-sequences (e.g., message identifiers (IDs) that are related to an anomaly)), reasoning data associated with an anomalous log (or associated with one or more anomalous sub-sequences of the anomalous log), a message identifier list associated with a system event occurred in the client while performing a firmware upgrade on a network interface card, etc.

In one or more embodiments, a first data frame may include (or specify), for example (but not limited to): a system log ID, a log description of the system log (e.g., a log that is generated as a result of performance testing of a NIC, a list of message descriptions, etc.), a sequence number of a system log block that is part of the system log (see FIG. 3), a message ID (or a message code, where each message code may be assumed as an event related token) included in the system log block (see FIG. 3), severity information included in the system log block (see FIG. 3), a description of a message included in the system log block (see FIG. 3), etc. The first data frame (e.g., a first table) may be generated to make the obtained historical metadata and corresponding descriptions suitable for processing through an anomaly detection model (said another way, the obtained data are transformed into ML model trainable format). For example, referring to FIG. 4.2, different fine-tuning steps may require input data in a different format and to satisfy this requirement (and to allow ease of further processing), the curated data (e.g., the obtained historical metadata and corresponding descriptions) may need to be prepared for the fine-tuning steps of the model.

In one or more embodiments, a second data frame may include (or specify), for example (but not limited to): one or more message IDs (e.g., RDU0011, SYS1003, NIC100, RDU0001, PSU0003, RED052, etc.) from the historical metadata, corresponding severity levels (e.g., information (related to RDU0011), information (related to SYS1003), warning (related to NIC100), information (related to RDU0001), critical (related to PSU0003), information (related to RED052), etc.), corresponding message descriptions (e.g., the power supplies are redundant (related to RDU0011), the system CPU is resetting (related to SYS1003), the embedded NIC 1 Port 1 network link is down (related to NIC100), the fans are redundant (related to RDU0001), the power supply unit (PSU) 2 is not receiving input power because of issues in PSU 2 or cable connections (related to PSU0003), processing of update packages is starting (related to RED052), etc.), etc.

In one or more embodiments, a third data frame may include (or specify), for example (but not limited to): an array of message IDs (or a sequence of message IDs) (e.g., a message ID list) associated with a system log, an ID of a test case (e.g., 109984_5) (in order to tune an anomaly detection model (see Step 418 of FIG. 4.2)), a description of the test case (e.g., verify VD 1 is secured after manually securing the controller), an anomaly flag (or "Anomaly_Message ID" such as RDU0001) to indicate the presence of an anomaly (if any) (e.g., a type of classification such as "presence of an anomaly" and "absence of an anomaly"), etc.

In one or more embodiments, a fourth data frame may include (or specify), for example (but not limited to): an array of message IDs (or a sequence of message IDs) (e.g., a message ID list) associated with a particular system log, an ID of a test case (e.g., 109984_5), a description of the test case (e.g., verify VD 1 is secured after manually securing the controller), a reason of an anomaly (e.g., reasoning data, a root cause of the anomaly, etc.) associated with the sequence of message IDs (e.g., the test case is about security verification but there is an unexpected fan redundancy which is an anomaly), one or more anomalous sub-sequences as part of the system log, one or more error descriptions, etc. In one or more embodiments, the fourth data frame may be generated to perform a root cause analysis task only with anomalous sub-sequences (or anomalous data) to reduce the anomaly detection model's hallucination.

In one or more embodiments, while monitoring, the analyzer (202) may need to, for example (but not limited to): inventory one or more hardware and/or software components of a client (e.g., 110A, FIG. 1); obtain type and model information of each component of a client; obtain a version of firmware or other code executing on a component of a client (e.g., a microservice executing on the client); obtain information specifying each component's interaction with one another in a client and/or with another component of a second client; etc.

In one or more embodiments, the analyzer (202) may derive minimum and maximum resource utilization values (with respect to each computing resource) as a reference to infer whether a continuous average resource utilization value (with respect to each computing resource) is derived properly. If there is an issue with the derived continuous average resource utilization value, based on the reference, the analyzer (202) may re-derive the continuous average resource utilization value.

One of ordinary skill will appreciate that the analyzer (202) may perform other functionalities without departing from the scope of the embodiments disclosed herein. The analyzer (202) may be implemented using hardware (e.g., a physical device including circuitry), software, or any combination thereof.

In one or more embodiments, the engine (204) may include functionality to, e.g.: (i) upon receiving/obtaining a second data frame from the database (e.g., 135, FIG. 1) or the analyzer (202), and by employing a linear model, a non-linear model, and/or a ML model, analyze the second data frame to tune an anomaly detection model (so that the anomaly detection model becomes aware of context (e.g., a message ID, severity information of an event occurred on a client, etc.) provided to the model (e.g., providing context awareness (or contextual awareness) to the anomaly detection model)); (ii) based on (i) and on a first target parameter, tune the anomaly detection model by using the second data frame; (iii) upon receiving/obtaining a third data frame from the database or the analyzer, and by employing a linear model, a non-linear model, and/or a ML model, analyze the third data frame to further tune the anomaly detection model (to make the anomaly detection model aware of syntactic similarities within the third data frame); (iv) based on (iii) and on a second target parameter, tune the anomaly detection model by using the third data frame; (v) upon receiving/obtaining a fourth data frame from the database or the analyzer, and by employing a linear model, a non-linear model, and/or a ML model, analyze the fourth data frame to further tune the anomaly detection model (to enable the anomaly detection model identifying a root cause of an anomaly in metadata (or a root cause of an anomalous sub-sequence (related to the anomaly) in the metadata) within the fourth data frame); (vi) based on (v) and on a third target parameter, tune the anomaly detection model by using the fourth data frame; (vii) based on (ii), (iv), and (vi) and using the visualizer (206), initiate notification of an administrator about the "tuned" anomaly detection model; (viii) upon receiving/obtaining cleaned relevant data from the analyzer, and by employing a linear model, a non-linear model, and/or a ML model, analyze the cleaned relevant data to infer length of a message ID list; (ix) based on (viii), make a determination as to whether the message ID list's length is greater than input context length (or input length) of the anomaly detection model; (x) based on the determination, employ the "tuned" anomaly detection model and make a second determination as to whether an anomaly is detected in the cleaned relevant data; (xi) based on the second determination and by employing the "tuned" anomaly detection model, infer one or more anomalous sub-sequences within the cleaned relevant data; (xii) based on (xi) and by employing the "tuned" anomaly detection model, infer a root cause of each of the anomalous sub-sequences; and/or (xiii) based on (xii) and via the visualizer (206), initiate displaying of the anomalous sub-sequences and corresponding root causes to the administrator to indicate an overall health status of a corresponding client.

Further, the engine (204) may include functionality to, e.g.: (i) in conjunction with the analyzer (202), provide a useful ML-based framework to an administrator to at least assist the administrator for accurately detecting one or more anomalies in, for example, system logs and to increase the administrator's performance (in terms of taking corrective actions to (a) remediate hardware/software component related issues (occurred in a client) faster and/or (b) prevent any future hardware/software component related issues that may occur on the client); (ii) in conjunction with the analyzer (202) and the visualizer (206), automate at least some of the "issue detection" tasks/duties assigned to an administrator for a better administrator experience; (iii) by employing a linear model, a non-linear model, and/or an ML model, engineer internally and externally obtained data (e.g., system logs) to assist the anomaly detection model (and/or an administrator) to derive quantitative factors/metrics/trends (e.g., root causes) impacting health of a corresponding client (so that, for example, the administrator may make better informed decisions with respect to mitigating potential risks associated with the client); (iv) leverage rolling windows to dynamically (or automatically) adjust input context length (or token length) of the anomaly detection model such that the model may process, for example, system logs that exceeds the input context length (or the input capacity) of the model (said another way, the engine may enable the model to take a log file that does not fit to the input context length of the model using the concept of time/sequence based rolling window); (v) upon receiving cleaned relevant data from the analyzer (202), predict a next device state of a device (e.g., a client) based on a current device state of the device (which is inferred from the cleaned relevant data); (vi) based on (v) or when a hardware component failure (e.g., a fan failure) is reported by a user of the client, generate a device state path for the device from a healthy device state (corresponds to a device state where the client is operating as expected) to an unhealthy device state (corresponds to a device state where the client is operating outside of its expected operating conditions (which may be defined, e.g., by a vendor)) using the cleaned relevant data; (vii) store the generated device state path in the database (e.g., 135, FIG. 1); (viii) upon receiving identified health (or identified health information) of each component of a corresponding client, tag/label each component as "healthy" or "unhealthy" for troubleshooting and optimization purposes (of the client); and/or (ix) based on, at least, (vi) and (viii), infer an overall health status of the client.

In one or more embodiments, generating the device state path (from the healthy device state to the unhealthy device state) may be useful (e.g., to the administrator) (i) to infer how the hardware component failure has occurred and (ii) to identify the various states that the client was in (and transition between these states). For example, there may be a strong correlation between the device state path and a root cause of the hardware component failure (where, as part of the cleaned relevant data, one or more anomalous sub-sequences may include details associated with the hardware component failure).

In one or more embodiments, by employing the anomaly detection model and based on the cleaned extracted data, the engine (204) may record (i) information of a user and a corresponding client (where the hardware component failure has occurred), (ii) a type of the hardware component failure, and (iii) severity of the hardware component failure to the database (e.g., 135, FIG. 1). For example, (a) Client A may report a critical printed circuit board failure, (b) a type of the failure may be recorded as aging of battery, and (c) a device state path for Client A may be obtained as "printed circuit board failure→system crash". As yet another example, (a) Client B may report a critical fan failure, (b) a type of the failure may be recorded as dust, and (c) a device state path for Client B may be obtained as "fan failure→overheating of CPU→CPU failure→system crash".

As yet another example, (a) Client A may report a critical fan failure and (b) a device state path for Client A may be obtained as "fan failure→10% degradation in Client A's performance". As yet another example, (a) Client C may report a critical fan failure and (b) a device state path for Client C may be obtained as "fan failure→memory module failure→system crash". As yet another example, (a) Client D may report a critical fan failure and (b) a device state path for Client C may be obtained as "fan failure→overheating of CPU→storage device failure". As yet another example, (a) Client E may report a critical fan failure and (b) a device state path for Client E may be obtained as "fan failure→storage device failure→virtual disk storage failure→system crash".

In one or more embodiments, the engine (204) may generate a device state chain using the device state path (which corresponds to device states up to a current device state), a current device state, and a next device state. As indicated, while generating the device state chain, not just the previous device state is considered, but the whole device state path is considered. For example, the engine (204) may generate a device state chain as A→B (where B is the current device state of a client) and B→C (where A represents "fan failure", B represents "overheating of CPU", and C represents "CPU failure"). In this example, the engine (204) (i) may calculate the probability of "A→B" in the device state chain as 0.2 and (ii) may calculate the probability of "B→C" in the device state chain as 0.3, where the probability of the device state chain "A→B→C" may be calculated as 0.06.

As yet another example, the engine (204) may generate a device state chain as A→B and B→E (e.g., another probable next device state) (where A represents "fan failure", B represents "overheating of CPU", and E represents "storage device failure"). In this example, the engine (204) (i) may calculate the probability of "A→B" in the device state chain as 0.2 and (ii) may calculate the probability of "B→E" in the device state chain as 0.1, where the probability of the device state chain "A→B→E" may be calculated as 0.02. Based on the aforementioned examples, the engine (204) may decide "A→B→C" as the device state chain because of its higher probability value.

As discussed above, the engine (204) may infer a current device state of a device (e.g., a client) based on cleaned relevant data (that is obtained from the analyzer (202)), in which the current device state may indicate a device state where a hardware component failure was reported. In one or more embodiments, the engine (204) may include a list of device states (associated with the client) where the client transitioned and, among the list of device states, a next device state may be the device state that has the highest probability to become the next device state.

In one or more embodiments, the engine (204) may initiate, for example, displaying of (i) one or more anomalous sub-sequences, (ii) a root cause of each of the anomalous sub-sequences, (iii) identified/tagged health of a corresponding client, (iv) a holistic user profile of a user of the client, and (v) analyzer generated alerts to an administrator via the visualizer (206) (e.g., via a GUI, an API, a programmatic interface, and/or a communication channel of the visualizer) to indicate an overall health status of the client. In one or more embodiments, for example, (i) each data item (e.g., an anomalous sub-sequence, a root cause, identified health of a client, an analyzer generated alert, etc.) may be displayed (e.g., highlighted, visually indicated, etc.) with a different color (e.g., red color tones may represent a negative overall health status of a client, green color tones may represent a positive overall health status of the client, etc.), and (ii) one or more useful insights/recommendations with respect to the overall health status of a client may be displayed in a separate window(s) on the visualizer (206) to assist the administrator while managing the overall health status of the client (e.g., for a better administrator experience, to help the administrator with respect to understanding the benefits and trade-offs of selecting different troubleshooting options, etc.).

Further, the visualizer (206) may include functionality to, e.g.: (i) obtain (or receive) data (e.g., any type and/or quantity of input) from any source (e.g., a user via a client (e.g., 110A, FIG. 1), the engine (204), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the infrastructure node (200) to operate as a service over the network (e.g., 130, FIG. 1) so that the visualizer (206) may be used externally; (iv) employ a set of subroutine definitions, protocols, and/or hardware/software components for enabling/facilitating communications between, for example, the engine (204) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows on, for example, its GUI; and/or (viii) generate visualizations of methods illustrated in FIGS. 4.1-5.3.

One of ordinary skill will appreciate that the visualizer (206) may perform other functionalities without departing from the scope of the embodiments disclosed herein. The visualizer (206) may be implemented using hardware, software, or any combination thereof.

One of ordinary skill will appreciate that the engine (204) may perform other functionalities without departing from the scope of the embodiments disclosed herein. The engine (204) may be implemented using hardware, software, or any combination thereof.

In one or more embodiments, the analyzer (202), the engine (204), and the visualizer (206) may be utilized in isolation and/or in combination to provide the aforementioned functionalities. These functionalities may be invoked using any communication model including, for example, message passing, state sharing, memory sharing, etc. By doing so, the infrastructure node (200) may address issues related to health of a client (e.g., 110A, FIG. 1) proactively.

Figure 3:
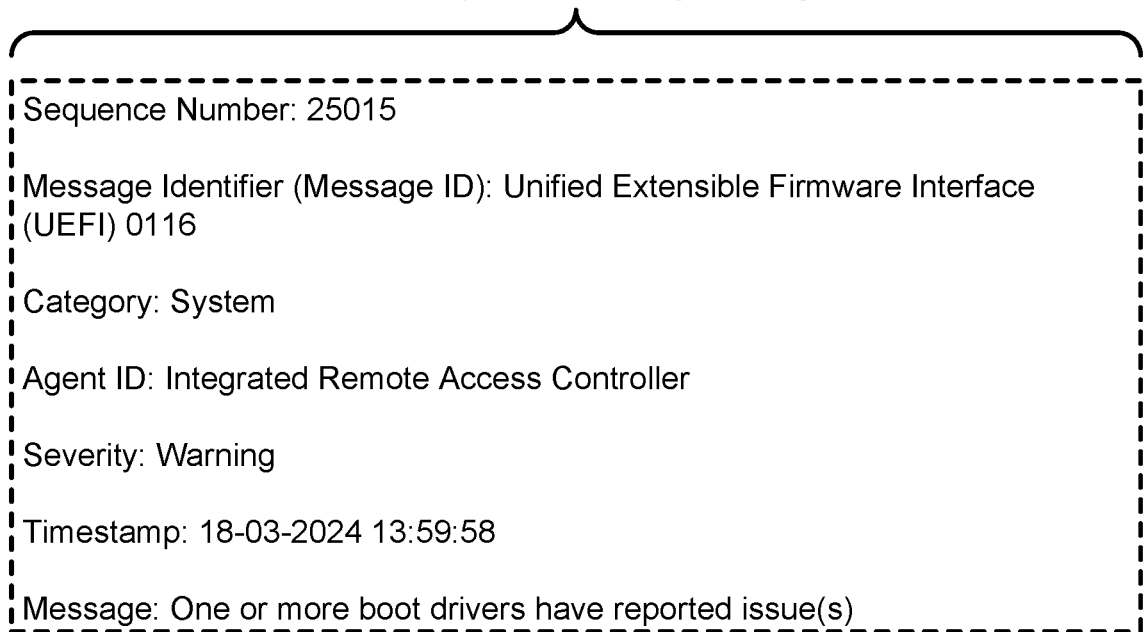
FIG. 3 shows an example block of a system log in accordance with one or more embodiments disclosed herein.

Turning now to FIG. 3, FIG. 3 shows an example block of a system log in accordance with one or more embodiments disclosed herein. Referring to FIG. 3, for analysis purposes, the example block of the system log may include (or specify), for example (but not limited to): a sequence number of a process/event (e.g., that is occurred on a client (e.g., 25015)), a message ID (e.g., UEFI0116), category information (of the log) (e.g., system), an agent ID (e.g., an integrated remote access controller), severity information (e.g., warning), a timestamp (e.g., 18-03-2024 13:59:58), a description of a message (e.g., one or more boot drivers have reported issue(s)), etc. In one or more embodiments, the system log may include, for example, few tens to few hundreds of blocks (e.g., a sequence of blocks) that represent a certain event occurred in a corresponding client (e.g., 110A, FIG. 1).

Further, as indicated, the example block may include just one entry (e.g., UEFI0116) or may include multiple entries (e.g., RDU0011, SYS1003, NIC100, RDU0001, PSU0003, RED052, UEFI0116, etc.), in which the multiple entries may be called as a "sub-sequence" (e.g., within the log). For example, an anomaly may be one message event (or may be represented by just one entry) or a group of events may form the anomaly. In one or more embodiments, a sub-sequence may be one event (e.g., "system crash") or multiple events (e.g., "fan failure→memory module failure→system crash", "fan failure→storage device failure→virtual disk storage failure→system crash", etc.).

FIG. 4.1 shows a method for preparing data in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.1, the method shown in FIG. 4.1 may be executed by, for example, the above-discussed analyzer (e.g., 202, FIG. 2). Other components of the system (100) illustrated in FIG. 1 may also execute all or part of the method shown in FIG. 4.1 without departing from the scope of the embodiments disclosed herein.

In Step 400, the analyzer receives a request from a requesting entity (e.g., an administrator via an administrator terminal, an application, etc.) that wants to generate and/or tune an anomaly detection model (e.g., an ML/AI model, an LLM, etc.) that, at least, detects an anomaly in metadata (e.g., system logs) or one or more anomalous sub-sequences in the metadata (that caused the anomaly).

In response to receiving the request, as part of that request, and/or in any other manner (e.g., before initiating any computation with respect to the request, to tune the anomaly detection model for anomaly detection, etc.), the analyzer invokes the database (e.g., 135, FIG. 1) to communicate with the database. After receiving the database's confirmation, the analyzer obtains historical metadata and their corresponding descriptions (e.g., corresponding log descriptions) from the database. In one or more embodiments, the aforementioned data may be obtained continuously or at regular intervals (e.g., every 5 hours) (without affecting production workloads of the database and the analyzer). Further, the aforementioned data may be access-protected for the transmission from, for example, the database to the analyzer, e.g., using encryption.

In one or more embodiments, the aforementioned data may be obtained as it becomes available or by the analyzer polling the database (via one or more API calls) for newer information. For example, based on receiving an API call from the analyzer, the database may allow the analyzer to obtain newer information.

In Step 402, in response to receiving the request, as part of that request, and/or in any other manner (e.g., before initiating any computation with respect to the request, to tune the anomaly detection model for anomaly detection, etc.), the analyzer invokes the database to communicate with the database. After receiving the database's confirmation, the analyzer obtains error descriptions (along with anomalous system logs) (e.g., to infer which sub-sequences (e.g., within the system logs) are anomalous and to infer a root cause of each of the anomalous sub-sequences) from the database. In one or more embodiments, the aforementioned data may be obtained continuously or at regular intervals (e.g., every 5 hours) (without affecting production workloads of the database and the analyzer). Further, the aforementioned data may be access-protected for the transmission from, for example, the database to the analyzer, e.g., using encryption.

In one or more embodiments, the aforementioned data may be obtained as it becomes available or by the analyzer polling the database (via one or more API calls) for newer information. For example, based on receiving an API call from the analyzer, the database may allow the analyzer to obtain newer information.

In Step 404, by employing a set of linear, non-linear, and/or ML models, the analyzer analyzes the historical metadata and their corresponding descriptions to generate a first data frame (e.g., a table). In one or more embodiments, the analyzer may store (temporarily or permanently) the first data frame to the database. Details of the first data frame is described above in reference to FIG. 2.

In Step 406, the analyzer cleans the first data frame (generated in Step 404) to obtain a cleaned data frame. In one or more embodiments, cleaning the first data frame may include identifying and removing consecutive events from the first data frame.

In Step 408, the analyzer generates (i) a second data frame (e.g., a table that is used as input to tune the anomaly detection so that the model can achieve domain awareness) and (ii) a third data frame (e.g., a table that is used as input to the anomaly detection so that the model become aware of syntactic similarities within the table while tuning the anomaly detection model) based on the cleaned data frame (obtained in Step 406).

In one or more embodiments, assume here that the cleaned data frame includes (or specifies), at least: (a) (i) sequence number: 12097, (ii) message ID: USR0030, (iii) severity: information, (iv) timestamp: 2023 Jul. 26 14:10:00, and (v) message: "successfully logged in using root"; and (b) (i) sequence number: 12096, (ii) message ID: USR0032, (iii) severity: information, (iv) timestamp: 2023 Jul. 26 14:10:00, and (v) message: "the session for root is logged off".

Based on the aforementioned cleaned data frame, the analyzer may generate the second data frame, in which the second data frame may include (or specify), at least: (a) (i) message ID: USR0030, (ii) message: "successfully logged in using root", and (iii) severity: information; and (b) (i) message ID: USR0032, (ii) message: "the session for root is logged off", and (iii) severity: information.

Further, based on the aforementioned cleaned data frame, the analyzer may generate the third data frame, in which the third data frame may include (or specify), at least: (a) (i) an array of message IDs (e.g., USR0030, USR0032, WRK0001, LOG007, etc.) associated with a particular system log, an ID of a test case (e.g., 109940_3), a description of the test case (e.g., verify VD 1 is secured after manually securing the controller), and an anomaly flag (e.g., RDU0001).

In one or more embodiments, the analyzer may store (temporarily or permanently) the second and third data frames to the database. In one or more embodiments, the analyzer may directly send the second and third data frames to the engine (e.g., 204, FIG. 2).

In Step 410, the analyzer generates a fourth data frame (e.g., a table that is used as input to tune the anomaly detection so that the model can identify a root cause of an anomaly within the table (e.g., the model can perform a root cause analysis of detected anomalous sub-sequences)) based on the cleaned data frame (obtained in Step 406) and error descriptions (obtained in Step 402).

Based on the aforementioned cleaned data frame (in Step 408) and error descriptions, the analyzer may generate the fourth data frame, in which the fourth data frame may include (or specify), at least: (a) (i) an array of message IDs (e.g., USR0030, USR0032, WRK0001, LOG007, etc.) associated with a particular system log, an ID of a test case (e.g., 109940_3), a description of the test case (e.g., verify VD 1 is secured after manually securing the controller), and an anomaly flag (e.g., RDU0001), and a reason of an anomaly associated with the array of message IDs (e.g., the test case is about security verification but there is an unexpected fan redundancy which is an anomaly).

In one or more embodiments, the analyzer may store (temporarily or permanently) the fourth data frame to the database. In one or more embodiments, the analyzer may directly send the fourth data frames to the engine.

In one or more embodiments, while the aforementioned data frames are generated, the analyzer (in conjunction with the engine) may leverage a rolling window approach, at least, (i) to dynamically (or automatically) adjust input context length (e.g., token length, an input length limit, etc.) of the anomaly detection model such that the model may process, for example, system logs that exceed the input context length of the model, and (ii) to manage a message ID list's length. In one or more embodiments, the rolling/sliding window approach is used for dynamically dividing a message ID list into rolling windows of (a) equal time interval or (b) token/word length.

For example, if the duration of a system log is 24 hours, a rolling window of an hour may be generated with an overlap of 5 minutes. As yet another example, if a message ID list's length spans out more than 4096 tokens (where 4096 tokens is the input length of the anomaly detection model), a rolling window of a constant token size may be dynamically generated with an overlap of approximately 100 tokens (between each successive rolling window) to accommodate the input length limit of the anomaly detection model. As indicated in both examples, an overlap of time duration or tokens is needed because otherwise the anomaly detection model may not understand the transition between successive windows (e.g., token groups). Said another way, just splitting, for example, the message ID list's length (e.g., 12744 tokens) into groups of 4000 tokens is not enough because the anomaly detection model may not understand the sequential transition between each of the successive token groups (that include message IDs associated with events occurred on a corresponding client).

In one or more embodiments, the rolling window approach may also allow detecting anomalies in system log sequences, especially when a system log sequence's length is too long. Said another way, a long sequenced system log may be managed by leveraging the rolling window approach.

FIG. 4.2 shows a method for tuning the anomaly detection model in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.2, the method shown in FIG. 4.2 may be executed by, for example, the above-discussed engine. Other components of the system (100) illustrated in FIG. 1 may also execute all or part of the method shown in FIG. 4.2 without departing from the scope of the embodiments disclosed herein.

In Step 412, the engine obtains the second data frame (generated in Step 408 of FIG. 4.1) from the database or the analyzer. Thereafter, by employing a set of linear, non-linear, and/or ML models, the analyzer analyzes the second data frame to tune the anomaly detection model so that the anomaly detection model may achieve domain awareness (e.g., the model may become aware of context (or contextual information) provided to the model, making the model aware of message IDs, etc.).

In one or more embodiments, for the fine-tuning (in Steps 414, 418, and 422), the engine may employ a quantized low-rank adaptors (QLoRa) based 4-bit fine-tuning approach along with a parameter efficient fine-tuning (PEFT) library. With this approach, the engine may only train/tune the topmost layers of the anomaly detection model rather than tuning the entire model (e.g., to minimize usage of the infrastructure node's computing resources while tuning the model).

In Step 414, based on a first target variable/parameter (e.g., being aware of the meaning of a provided message ID, for example, UEFI0116 means that (i) severity: warning and (ii) message: "one or more boot drivers have reported issue(s)") and one or more instructions (obtained from the database), the engine tunes the anomaly detection model (e.g., to obtain a tuned anomaly detection model) by using the second data frame.

In Step 416, the engine obtains the third data frame (generated in Step 408 of FIG. 4.1) from the database or the analyzer. Thereafter, by employing a set of linear, non-linear, and/or ML models, the engine analyzes the third data frame to further tune the "tuned" anomaly detection model to make the "tuned" anomaly detection model aware of syntactic similarities (e.g., relationships between two words/tokens) within the third data frame. For example, the third data frame may include a sequence of message IDs that are grouped together as a system log description so that the "tuned" anomaly detection model may become aware of the syntactic similarity between the system log description and its corresponding message ID list.

In Step 418, based on a second target variable/parameter (e.g., being able to detect anomalous sub-sequences in a given log file) and one or more instructions (obtained from the database), the engine further tunes the anomaly detection model (which has been tuned previously in Step 414) by using the third data frame.

In Step 420, the engine obtains the fourth data frame (generated in Step 410 of FIG. 4.1) from the database or the analyzer. Thereafter, by employing a set of linear, non-linear, and/or ML models, the engine analyzes the fourth data frame to further tune the "tuned" anomaly detection model so that the model can identify a root cause of an anomaly (or a root cause of each of anomalous sub-sequences) within the fourth data frame.

In one or more embodiments, in Step 422 (similar to Step 418), the engine may also consider leveraging the rolling window approach (if necessary) (i) for anomalous sub-sequence detection and (ii) for providing the reason why the "tuned" anomaly detection model inferred a corresponding sub-sequence as "anomalous".

In one or more embodiments, for tuning purposes, the fourth data frame may only include a system log (which may include one or more sub-sequences) that includes only anomalies. Based on that, a message ID list may be extracted along with one or more anomalous sub-sequences and the reasoning why a corresponding sub-sequence is an anomalous sub-sequence. This reasoning may assist the "tuned" anomaly detection model with respect to the context of why the sub-sequence is considered as "anomalous", which is in fact useful when the "tuned" anomaly detection model needs to perform a root cause analysis (see e.g., Step 518 of FIG. 5.2).

In one or more embodiments, the "tuned" anomaly detection model may be adapted to execute specific determinations described herein with reference to any component of the system (e.g., 100, FIG. 1) and processing operations executed thereby.

In one or more embodiments, as the "tuned" anomaly detection model is a learning model, accuracy of the model may be improved over time through iterations of tuning/training, receipt of user feedbacks, etc. Further, training the anomaly detection model may include application of a training algorithm. As an example, a decision tree (e.g., a Gradient Boosting Decision Tree) may be used to train the anomaly detection model. In doing so, one or more types of decision tree algorithms may be applied for generating any number of decision trees to fine-tune the anomaly detection model. In one or more embodiments, training of the anomaly detection model may further include generating an ML/AI model that is tuned to reflect specific metrics for accuracy, precision and/or recall before the trained ML/AI model is exposed for real-time (or near real-time) usage.

In one or more embodiments, the "tuned" anomaly detection model may then be used for inferencing purposes (or for the "inferencing phase", see FIGS. 5.1-5.3).

In Step 424, after obtaining the "tuned" anomaly detection model (e.g., after the model is ready for inferencing), the engine initiates notification of an administrator about the model. The notification may include, for example (but not limited to): for what purpose the model has been tuned/trained, the range of message ID list that has been taken into account while tuning the model, the amount of time that has been spent while performing the tuning process, etc.

In one or more embodiments, the notification may also indicate whether the tuning process was completed within the predetermined window, or whether the process was completed after exceeding the predetermined window. The notification may be displayed on a GUI of the visualizer (e.g., 206, FIG. 2). In one or more embodiments, the method may end following Step 424.

FIGS. 5.1-5.3 show a method for detecting an anomaly in a client (using the model tuned in FIG. 4.2) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.1, the method shown in FIG. 5.1 may be executed by, for example, the above-discussed analyzer and engine. Other components of the system (100) illustrated in FIG. 1 may also execute all or part of the method shown in FIG. 5.1 without departing from the scope of the embodiments disclosed herein.

In Step 500, the analyzer receives a request from a requesting entity (e.g., an administrator via an administrator terminal, an application, etc.) that wants to determine a health status (or health) of a client (e.g., 110A, FIG. 1) using the "tuned" anomaly detection model, which, at least, detects an anomaly in metadata (e.g., system logs that state which hardware and/or software components failed through one or more events being captured from the client) or one or more anomalous sub-sequences in the metadata (that caused the anomaly).

In response to receiving the request, as part of that request, and/or in any other manner (e.g., before initiating any computation with respect to the request), the analyzer invokes the client to communicate with the client. After receiving the client's confirmation, the analyzer obtains metadata and their corresponding descriptions (e.g., corresponding log descriptions) from the client. In one or more embodiments, the aforementioned data may be obtained continuously or at regular intervals (e.g., every 5 hours) (without affecting production workloads of the client and the analyzer). Further, the aforementioned data may be access-protected for the transmission from, for example, the client to the analyzer, e.g., using encryption.

In one or more embodiments, the aforementioned data may be obtained as it becomes available or by the analyzer polling the client (via one or more API calls) for newer information. For example, based on receiving an API call from the analyzer, the client may allow the analyzer to obtain newer information.

In one or more embodiments, before analyzing (in Step 502) the metadata and corresponding descriptions, the analyzer may store (temporarily or permanently) these data in the database.

In Step 502, by employing a set of linear, non-linear, and/or ML models, the analyzer analyzes the metadata and their corresponding descriptions to extract relevant data. In one or more embodiments, the relevant data may include, for example (but not limited to): a message ID list, one or more system log descriptions, information with respect to how a user was utilizing the client (e.g., computing resource utilization information; a centralized protection policy is used by the user extensively; last week between time 1 and time 2, one of the CPUs of client has exceeded recommended maximum CPU operating temperature; etc.), one or more anomalous sub-sequences, a message associated with a message identifier that is listed on the message identifier list, severity information associated with the message, etc.

In one or more embodiments, based on the relevant data, the analyzer may identify health of each component (of the client), for example, which component is healthy (e.g., providing consistent performance, generating a response to a request, etc.) or which component is unhealthy (e.g., slowing down in terms of performance, not generating a response to a request, over-provisioned, exceeding a predetermined maximum resource utilization value threshold, etc.). Further, based on the identification, the analyzer may automatically react and generate alerts if one of the components is unhealthy. Thereafter, the analyzer may send identified health of each component (and, indirectly, health of the client) and generated alerts (if any) to the engine in order to manage health of the client.

In one or more embodiments, the analyzer may store (temporarily or permanently) the relevant data, identified health of each component, and/or alerts to the database.

In Step 504, the analyzer cleans the relevant data (extracted in Step 502) to obtain cleaned relevant data. In one or more embodiments, cleaning the relevant data may include identifying and removing consecutive events from the relevant data. In Step 506, the analyzer provides the cleaned relevant data to the engine (e.g., for the detection of any anomaly in the cleaned relevant data (or, indirectly, in the metadata obtained in Step 500)).

In Step 508, by employing a set of linear, non-linear, and/or ML models, the engine analyzes the cleaned relevant data to infer length of a message ID list (associated with the metadata obtained in Step 500).

In Step 510, based on Step 508, the engine makes a first determination (in real-time or near real-time) as to whether the message ID list's length is greater than input length of the "tuned" anomaly detection model. Accordingly, in one or more embodiments, if the result of the first determination is NO, the method proceeds to Step 512 of FIG. 5.2. If the result of the determination is YES, the method alternatively proceeds to Step 522 of FIG. 5.3.

Turning now to FIG. 5.2, the method shown in FIG. 5.2 may be executed by, for example, the above-discussed engine. Other components of the system (100) illustrated in FIG. 1 may also execute all or part of the method shown in FIG. 5.2 without departing from the scope of the embodiments disclosed herein.

In Step 512, as a result of the first determination in Step 510 of FIG. 5.1 being NO and by employing the "tuned" anomaly detection model, the engine makes a second determination (in real-time or near real-time) as to whether an anomaly (e.g., an unexpected event that is linked to a NIC hosted by the client, which may not be a total failure that has occurred on the client) is detected in the cleaned relevant data. Accordingly, in one or more embodiments, if the result of the second determination is NO, the method proceeds to Step 514. If the result of the second determination is YES, the method alternatively proceeds to Step 516.

In one or more embodiments, by making the second determination, the engine may obtain more information regarding, e.g.: (i) operations performed and/or failures (or anomalies (e.g., a list of events occurred on the client that caused the anomalies)) occurred on the client, and (ii) one or more reasons of those failures (or anomalies).

In Step 514, as a result of the second determination in Step 512 being NO, the engine initiates notification of the administrator about health of the client (e.g., the client is a healthy client). The notification may include, for example (but not limited to): an overall health status of the client (including health of each component of the client), a recommendation about how to keep the client (and its components) healthy, the amount of time that has been spent while performing the anomaly detection process, etc.

In one or more embodiments, the notification may also indicate whether the anomaly detection process was completed within the predetermined window, or whether the process was completed after exceeding the predetermined window. The notification may be displayed on a GUI of the visualizer.

In one or more embodiments, if the "tuned" anomaly detection model is not operating properly (e.g., is not providing the above-discussed functionalities), the model may be re-trained (or re-tuned) using any form of training data and/or the model may be updated periodically as there are improvements in the model (e.g., the model may be tuned using more appropriate training data).

In one or more embodiments, the method may end following Step 514.

In Step 516, as a result of the second determination in Step 512 being YES and by employing the "tuned" anomaly detection model (e.g., through its syntactic and semantic learning capabilities), the engine infers one or more anomalous sub-sequences within the cleaned relevant data (e.g., one or more sub-sequences in a corresponding message ID list/sequence that starts with PSU0003 and ends with WRK0001, including, at least, NIC100, WRK0001, NIC101, USR0032, RED054, IPA0100, USR107, etc.). In the aforementioned message ID list, the engine may infer (and pinpoint) PSU0003 (e.g., a first NIC related event occurred on the client) and NIC100 (e.g., a second NIC related event occurred on the client) as anomalous sub-sequences (which, in fact, should not have occurred on the client, for example, as part of firmware upgrade). Separately, the engine may infer (and pinpoint) message IDs from PSU0003 to NIC100 as an anomalous sub-sequence (e.g., an anomalous sub-sequence may specify a set of anomalous events that caused an anomaly).

As used herein, an "anomalous event" may be an issue with respect to a cable connection of a PSU hosted by a client and an "anomaly" may be lack of fan redundancy in the client.

In one or more embodiments, these anomalous sub-sequences may not cause any failure on the client but may lead a failure in the future. For example, based on the identified health of each component of the client (received from the analyzer) and after generating the device state path (from the healthy device state to the unhealthy device state), the engine may generate a device state path for the client as "NIC101 (e.g., the embedded NIC 1 Port 1 network link is started)→PSU0003 (e.g., PSU 1 could not detect a cable connection)→OSE0014 (e.g., OS T could not detect NIC 1 Port 1)→NIC100 (e.g., the embedded NIC 1 Port 1 network link is down)→SDA054 (e.g., system crash)".

As indicated, in the aforementioned device state path, the engine may determine/predict a next device state of the client as "system crash".

In Step 518, by employing the "tuned" anomaly detection model, the engine infers a root cause of each of the anomalous sub-sequences (identified in Step 516), through the contextual and syntactical learning capabilities of the model. Referring back to the example introduced in Step 516, the engine may infer "PSU0003" and "OSE0014" as root causes of "NIC100", in which each of the root causes indicates why "NIC100" is considered as an anomalous sub-sequence. This level of detail may provide more in-depth information (to the administrator) regarding the root cause of the anomaly because just indicating (e.g., without pinpointing) "there is an anomaly in the system log (that includes, for example, 10000 lines of entries)" may not be sufficient (for the administrator) to identify the root cause.

In Step 520, based on Step 518, the engine initiates displaying of, via the visualizer's GUI, the anomalous sub-sequences and corresponding root causes to the administrator to indicate health of the client (e.g., the client is an unhealthy client). While displaying, the engine may also indicate, for example (but not limited to): an overall health status of the client (including health of each component of the client), a recommendation about how to keep the client (and its components) healthy (e.g., providing one or more preventive and proactive actions in order to assist the administrator to rectify the detected anomalies), the amount of time that has been spent while performing the anomaly detection process, etc.

In one or more embodiments, while displaying, the engine may also indicate whether the anomaly detection process was completed within the predetermined window, or whether the process was completed after exceeding the predetermined window.

In one or more embodiments, the engine may include a recommendation monitoring service to monitor whether a provided recommendation is implemented by the administrator on the client. The recommendation monitoring service may be a computer program that may be executed on the underlying hardware of the engine. The recommendation monitoring service may be designed and configured to facilitate remote access to check the health status (e.g., healthy after implementing the provided recommendation, still unhealthy even after implementing the provided recommendation, etc.) of the client. Based on the monitoring, if the status of the client is still unhealthy even after implementing the provided recommendation, the engine may provide a second recommendation to the administrator.

In one or more embodiments, if the "tuned" anomaly detection model is not operating properly (e.g., is not providing the above-discussed functionalities), the model may be re-trained (or re-tuned) using any form of training data and/or the model may be updated periodically as there are improvements in the model (e.g., the model may be tuned using more appropriate training data).

In one or more embodiments, the method may end following Step 520.

Turning now to FIG. 5.3, the method shown in FIG. 5.3 may be executed by, for example, the above-discussed engine. Other components of the system (100) illustrated in FIG. 1 may also execute all or part of the method shown in FIG. 5.3 without departing from the scope of the embodiments disclosed herein.

In Step 522, as a result of the first determination in Step 510 of FIG. 5.1 being YES and by leveraging the rolling window approach (see Step 410 of FIG. 4.1), the engine divides the message ID list into one or more rolling windows of (i) equal time interval or (ii) token length (so that the "tuned" anomaly detection model may ingest a log file that does not fit within the input length of the model). In one or more embodiments, each of the rolling windows (or "splits", including at least message IDs) is processed individually (see e.g., Steps 524 and 530) and when all the rolling windows are processed, the engine accumulates the results and presents them to the administrator (see FIGS. 526 and 530).

In one or more embodiments, while the rolling window approach is being utilized, the engine may repeat a corresponding system log description for all the splits and, as discussed in Step 410 of FIG. 4.1, the engine may introduce an overlap between each split to make sure that while the splits are combined, anomalies (or anomalous sub-sequences) are detected properly.

In Step 524, by employing the "tuned" anomaly detection model, the engine makes a third determination (in real-time or near real-time) as to whether an anomaly (e.g., an unexpected event that is linked to a NIC hosted by the client, which may not be a total failure that has occurred on the client) is detected in a rolling window. Accordingly, in one or more embodiments, if the result of the third determination is NO, the method proceeds to Step 526. If the result of the third determination is YES, the method alternatively proceeds to Step 528.

In one or more embodiments, by making the third determination, the engine may obtain more information regarding, e.g.: (i) operations performed and/or failures (or anomalies (e.g., a list of events occurred on the client that caused the anomalies)) occurred on the client, and (ii) one or more reasons of those failures (or anomalies).

In Step 526, as a result of the third determination in Step 522 being NO, the engine initiates notification of the administrator about health of the client (e.g., the client is a healthy client). The notification may include, for example (but not limited to): an overall health status of the client (including health of each component of the client), a recommendation about how to keep the client (and its components) healthy, the amount of time that has been spent while performing the anomaly detection process, etc.

In one or more embodiments, the notification may also indicate whether the anomaly detection process was completed within the predetermined window, or whether the process was completed after exceeding the predetermined window. The notification may be displayed on a GUI of the visualizer.

In one or more embodiments, if the "tuned" anomaly detection model is not operating properly (e.g., is not providing the above-discussed functionalities), the model may be re-trained (or re-tuned) using any form of training data and/or the model may be updated periodically as there are improvements in the model (e.g., the model may be tuned using more appropriate training data).

In one or more embodiments, the method may end following Step 526.

In Step 528, as a result of the third determination in Step 524 being YES and by employing the "tuned" anomaly detection model (e.g., through its syntactic and semantic learning capabilities), the engine infers one or more anomalous sub-sequences within each rolling window. For example, in Rolling Window A, the engine may infer (and pinpoint) PSU0003 (e.g., a first NIC related event occurred on the client) and NIC100 (e.g., a second NIC related event occurred on the client) as anomalous sub-sequences (which, in fact, should not have occurred on the client, for example, as part of firmware upgrade). Separately, the engine may infer (and pinpoint) message IDs from PSU0003 to NIC100 as an anomalous sub-sequence. In the same example, in Rolling Window B, the engine may not infer any anomalous sub-sequences.

In one or more embodiments, the anomalous sub-sequences (detected in Rolling Window A) may not cause any failure on the client but may lead a failure in the future. For example, based on the identified health of each component of the client (received from the analyzer) and after generating the device state path (from the healthy device state to the unhealthy device state), the engine may generate a device state path for the client as "NIC101 (e.g., the embedded NIC 1 Port 1 network link is started)→PSU0003 (e.g., PSU 1 could not detect a cable connection)→OSE0014 (e.g., OS T could not detect NIC 1 Port 1)→NIC100 (e.g., the embedded NIC 1 Port 1 network link is down)→SDA054 (e.g., system crash)".

As indicated, in the aforementioned device state path, the engine may determine/predict a next device state of the client as "system crash".

In Step 530, by employing the "tuned" anomaly detection model, the engine infers a root cause of each of the anomalous sub-sequences (identified in Step 528), through the contextual and syntactical learning capabilities of the model. Referring back to the example introduced in Step 528, the engine may infer "PSU0003" and "OSE0014" as root causes of "NIC100", in which each of the root causes indicates why "NIC100" is considered as an anomalous sub-sequence. This level of detail may provide more in-depth information (to the administrator) regarding the root cause of the anomaly because just indicating (e.g., without pinpointing) "there is an anomaly in the system log (that includes, for example, 10000 lines of entries)" may not be sufficient (for the administrator) to identify the root cause.

In Step 532, based on Step 530, the engine initiates displaying of, via the visualizer's GUI, the overall anomalous sub-sequences (detected in each rolling window) and corresponding root causes to the administrator to indicate health of the client (e.g., the client is an unhealthy client). While displaying, the engine may also indicate, for example (but not limited to): an overall health status of the client (including health of each component of the client), a recommendation about how to keep the client (and its components) healthy (e.g., providing one or more preventive and proactive actions in order to assist the administrator to rectify the detected anomalies), the amount of time that has been spent while performing the anomaly detection process, etc.

In one or more embodiments, while displaying, the engine may also indicate whether the anomaly detection process was completed within the predetermined window, or whether the process was completed after exceeding the predetermined window.

In one or more embodiments, the engine may include a recommendation monitoring service to monitor whether a provided recommendation is implemented by the administrator on the client. The recommendation monitoring service may be a computer program that may be executed on the underlying hardware of the engine. The recommendation monitoring service may be designed and configured to facilitate remote access to check the health status (e.g., healthy after implementing the provided recommendation, still unhealthy even after implementing the provided recommendation, etc.) of the client. Based on the monitoring, if the status of the client is still unhealthy even after implementing the provided recommendation, the engine may provide a second recommendation to the administrator.

In one or more embodiments, if the "tuned" anomaly detection model is not operating properly (e.g., is not providing the above-discussed functionalities), the model may be re-trained (or re-tuned) using any form of training data and/or the model may be updated periodically as there are improvements in the model (e.g., the model may be tuned using more appropriate training data).

In one or more embodiments, the method may end following Step 532.

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an anomaly in a client, the method comprising:
   obtaining, by an analyzer, historical metadata (HM) and information about the HM;
   obtaining, by the analyzer, an error description that is associated with the HM;
   analyzing, by the analyzer, the HM and the information to generate a first data frame (DF), wherein the first DF is cleaned to obtain a cleaned DF;

generating, by the analyzer, a second DF and a third DF based on the cleaned DF, wherein the second DF and the third DF are sent to an engine;

generating, by the analyzer, a fourth DF based on the cleaned DF and the error description, wherein the fourth DF is sent to the engine;

tuning, by the engine, an anomaly detection model (ADM) to obtain a tuned ADM using:
  a first target parameter (TP) and the second DF;
  a second TP and the third DF; and
  a third TP and the fourth DF;

after obtaining the tuned ADM:
  obtaining, by the analyzer, metadata and second information about the metadata from the client;
  analyzing, by the analyzer, the metadata and the second information to extract relevant data, wherein the relevant data is cleaned to obtain cleaned relevant data (CRD), wherein the CRD is provided to the engine;
  analyzing, by the engine, the CRD to infer a length of a message identifier list;
  making, by the engine, a determination that the length of the message identifier list is less than or equal to an input length of the tuned ADM;
  based on the determination, inferring, by the engine and using the tuned ADM, an anomaly in the CRD;
  inferring, by the engine and using the tuned ADM, an anomalous sub-sequence in the CRD, wherein the anomalous sub-sequence specifies a set of anomalous events that caused the anomaly;
  inferring, by the engine and using the tuned ADM, a root cause of the anomalous sub-sequence; and
  initiating, by the engine, displaying of the anomalous sub-sequence and the root cause to an administrator on a graphical user interface to indicate health of the client.

2. The method of claim 1,
wherein the HM comprises at least one selected from a group consisting of a system log, an application log, a second system log that specifies a second anomaly, and an important keyword for a hardware device hosted by the client,
wherein the system log comprises a plurality of system log blocks,
wherein the application log specifies a list of states that an application executing on the client has previously transitioned, and
wherein the important keyword is selected by a vendor.

3. The method of claim 2, wherein a system log block of the plurality of system log blocks specifies at least a system event that is occurred in the client, wherein the system log block is generated during the system event, wherein the system log block comprises at least one selected from a group consisting of a sequence number that is associated with the event, an identifier of a message that is associated with the event, severity information of the event, and the message.

4. The method of claim 1, wherein the first TP enables the ADM to become aware of a context provided to the ADM, wherein the context comprises at least a message identifier and severity information of a system event occurred in the client.

5. The method of claim 1, wherein the ADM is a large language model.

6. The method of claim 1, wherein the relevant data comprises at least the message identifier list, a message associated with a message identifier that is listed on the message identifier list, and severity information associated with the message.

7. The method of claim 1, wherein the error description comprises at least a message identifier list associated with a system event occurred in the client while performing a firmware upgrade on a network interface card.

8. The method of claim 1, wherein an anomalous event of the set of anomalous events is an issue with respect to a cable connection of a power supply unit hosted by the client, wherein the anomaly is a lack of fan redundancy in the client.

9. The method of claim 8, wherein the root cause of the anomalous sub-sequence is an operating system related issue that caused the power supply unit not to detect the cable connection.

10. A method for managing an anomaly in a client, the method comprising:
  obtaining, by an analyzer, historical metadata (HM) and information about the HM;
  obtaining, by the analyzer, an error description that is associated with the HM;
  analyzing, by the analyzer, the HM and the information to generate a first data frame (DF), wherein the first DF is cleaned to obtain a cleaned DF;
  generating, by the analyzer, a second DF and a third DF based on the cleaned DF, wherein the second DF and the third DF are sent to an engine;
  generating, by the analyzer, a fourth DF based on the cleaned DF and the error description, wherein the fourth DF is sent to the engine;
  tuning, by the engine, an anomaly detection model (ADM) to obtain a tuned ADM using:
    a first target parameter (TP) and the second DF;
    a second TP and the third DF;
    a third TP and the fourth DF; and
  initiating, by the engine, notification of an administrator about the tuned ADM.

11. The method of claim 10, further comprising:
after the notification of the administrator:
  obtaining, by the analyzer, metadata and second information about the metadata from the client;
  analyzing, by the analyzer, the metadata and the second information to extract relevant data, wherein the relevant data is cleaned to obtain cleaned relevant data (CRD), wherein the CRD is provided to the engine;
  analyzing, by the engine, the CRD to infer a length of a message identifier list;
  making, by the engine, a determination that the length of the message identifier list is less than or equal to an input length of the tuned ADM;
  based on the determination, inferring, by the engine and using the tuned ADM, an anomaly in the CRD;
  inferring, by the engine and using the tuned ADM, an anomalous sub-sequence in the CRD, wherein the anomalous sub-sequence specifies a set of anomalous events that caused the anomaly;
  inferring, by the engine and using the tuned ADM, a root cause of the anomalous sub-sequence; and
  initiating, by the engine, displaying of the anomalous sub-sequence and the root cause to the administrator on a graphical user interface to indicate health of the client.

12. The method of claim 11, wherein the relevant data comprises at least the message identifier list, a message associated with a message identifier that is listed on the message identifier list, and severity information associated with the message.

13. The method of claim 11, wherein an anomalous event of the set of anomalous events is an issue with respect to a cable connection of a power supply unit hosted by the client, wherein the anomaly is a lack of fan redundancy in the client.

14. The method of claim 13, wherein the root cause of the anomalous sub-sequence is an operating system related issue that caused the power supply unit not to detect the cable connection.

15. The method of claim 10,
wherein the HM comprises at least one selected from a group consisting of a system log, an application log, a second system log that specifies an anomaly, and an important keyword for a hardware device hosted by the client,
wherein the system log comprises a plurality of system log blocks,
wherein the application log specifies a list of states that an application executing on the client has previously transitioned, and
wherein the important keyword is selected by a vendor.

16. The method of claim 15, wherein a system log block of the plurality of system log blocks specifies at least a system event that is occurred in the client, wherein the system log block is generated during the system event, wherein the system log block comprises at least one selected from a group consisting of a sequence number that is associated with the event, an identifier of a message that is associated with the event, severity information of the event, and the message.

17. The method of claim 10, wherein the first TP is enabling the ADM to become aware of a context provided to the ADM, wherein the context comprises at least a message identifier and severity information of a system event occurred in the client.

18. The method of claim 10, wherein the error description comprises at least a message identifier list associated with a system event occurred in the client while performing a firmware upgrade on a network interface card.

19. A method for managing an anomaly in a client, the method comprising:
obtaining, by an analyzer, metadata and information about the metadata from the client;
analyzing, by the analyzer, the metadata and the information to extract relevant data, wherein the relevant data is cleaned to obtain cleaned relevant data (CRD), wherein the CRD is provided to an engine;
analyzing, by the engine, the CRD to infer a length of a message identifier list;
making, by the engine, a determination that the length of the message identifier list is less than or equal to an input length of a tuned anomaly detection model (ADM);
based on the determination, inferring, by the engine and using the tuned ADM, an anomaly in the CRD;
inferring, by the engine and using the tuned ADM, an anomalous sub-sequence in the CRD, wherein the anomalous sub-sequence specifies a set of anomalous events that caused the anomaly;
inferring, by the engine and using the tuned ADM, a root cause of the anomalous sub-sequence; and
initiating, by the engine, displaying of the anomalous sub-sequence and the root cause to an administrator on a graphical user interface to indicate health of the client.

20. The method of claim 19, further comprising:
prior to the obtaining the metadata and the information about the metadata:
obtaining, by the analyzer, historical metadata (HM) and second information about the HM;
obtaining, by the analyzer, an error description that is associated with the HM;
analyzing, by the analyzer, the HM and the second information to generate a first data frame (DF), wherein the first DF is cleaned to obtain a cleaned DF;
generating, by the analyzer, a second DF and a third DF based on the cleaned DF, wherein the second DF and the third DF are sent to the engine;
generating, by the analyzer, a fourth DF based on the cleaned DF and the error description, wherein the fourth DF is sent to the engine; and
tuning, by the engine, an ADM to obtain the tuned ADM using:
a first target parameter (TP) and the second DF;
a second TP and the third DF; and
a third TP and the fourth DF.

* * * * *